United States Patent
Ishibashi et al.

(10) Patent No.: US 9,082,444 B2
(45) Date of Patent: Jul. 14, 2015

(54) MAGNETIC RECORDING MEDIUM AND METHOD OF MANUFACTURING A MAGNETIC RECORDING MEDIUM

(75) Inventors: Shinichi Ishibashi, Shinjuku-ku (JP); Akira Shimada, Shinjuku-ku (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 870 days.

(21) Appl. No.: 12/593,243

(22) PCT Filed: Mar. 28, 2008

(86) PCT No.: PCT/JP2008/056038
§ 371 (c)(1),
(2), (4) Date: Sep. 25, 2009

(87) PCT Pub. No.: WO2008/117864
PCT Pub. Date: Oct. 2, 2008

(65) Prior Publication Data
US 2010/0143752 A1     Jun. 10, 2010

(30) Foreign Application Priority Data

Mar. 28, 2007   (JP) .................................. 2007-083547

(51) Int. Cl.
*G11B 5/65* (2006.01)
*G11B 5/855* (2006.01)
(Continued)

(52) U.S. Cl.
CPC .................. *G11B 5/855* (2013.01); *B82Y 10/00* (2013.01); *G11B 5/743* (2013.01); *G11B 5/82* (2013.01); *G11B 5/66* (2013.01)

(58) Field of Classification Search
None
See application file for complete search history.

(56) References Cited

U.S. PATENT DOCUMENTS

| 6,898,031 | B1 * | 5/2005 | Belser et al. .................... 360/15 |
| 2005/0037237 | A1 * | 2/2005 | Chen et al. ................. 428/694 T |

(Continued)

FOREIGN PATENT DOCUMENTS

| EP | 1158498 A2 | 11/2001 |
| EP | 1343158 A2 | 9/2003 |

(Continued)

OTHER PUBLICATIONS

Written Opinion and Search Report dated Jan. 14, 2011, in corresponding Singapore Patent Application No. 200906433-8, 14 pages.

(Continued)

*Primary Examiner* — Holly Rickman
*Assistant Examiner* — Linda Chau

(57) ABSTRACT

[PROBLEMS] To appropriately form a DTR medium, a patterned medium, or the like in a manner less likely to cause the problems of prolonged process time and increased cost.
[MEANS FOR SOLVING PROBLEMS] A perpendicular magnetic recording layer 22 has a plurality of tracks 102 which define recording regions extending in a scanning direction of a magnetic head and which are arranged in parallel in a direction intersecting with the scanning direction. The perpendicular magnetic recording layer 22 has a guard band region 104 formed on its surface and provided with a groove portion 202 which extends along the tracks 102. In a cross-section of the perpendicular magnetic recording layer 22 taken along a plane perpendicular to the scanning direction, the maximum depth D of the groove portion 202 is in the range of 0.5 to 10 nm with reference to an average height (broken line 302) of the tracks 102 between which the groove portion 202 is interposed. The average height is obtained in the vicinity of the centers of the tracks 102 in a widthwise direction. The width W of a region of the groove portion 202 having a depth equal to or greater than ½ of the maximum depth is in the range of 5 to 30% of a track pitch.

17 Claims, 6 Drawing Sheets

(51) Int. Cl.
*B82Y 10/00* (2011.01)
*G11B 5/74* (2006.01)
*G11B 5/82* (2006.01)
*G11B 5/66* (2006.01)

(56) References Cited

U.S. PATENT DOCUMENTS

2005/0095402 A1* 5/2005 Kaizu et al. ................. 428/167
2006/0023329 A1  2/2006 Tagami
2006/0029834 A1* 2/2006 Suwa et al. ................ 428/848.5
2008/0090104 A1* 4/2008 Sonobe et al. ............... 428/800

FOREIGN PATENT DOCUMENTS

| JP | 5-334666 A | 12/1993 | |
| JP | 2001110001 A * | 4/2001 | ............ G11B 5/02 |
| JP | 2006-031789 A | 2/2006 | |
| JP | 2006-127590 A | 5/2006 | |
| JP | 2007157311 | 6/2007 | |

OTHER PUBLICATIONS

JP Office Action dated Oct. 24, 2012 from Application Serial No. JP2009-506381 (English Translation), 3 pages.

* cited by examiner (a)

(b)

MAGNETIC RECORDING MEDIUM AND METHOD OF MANUFACTURING A MAGNETIC RECORDING MEDIUM

TECHNICAL FIELD

The present invention relates to a magnetic recording medium and a method of manufacturing a magnetic recording medium.

BACKGROUND ART

Recent proposals have been made about DTR (discrete track recording) media having a patterned magnetic recording layer, patterned (bit patterned) media, and other magnetic recording media for magnetic disks for HDDs (hard disk drives) or the like. In such magnetic recording media, the magnetic recording layer is patterned by lithography, etching, or the like. As a technique of forming a resist pattern in lithography, proposal is made of a method using an imprinting mold (for example, see Patent Document 1).

Proposals have also been made about methods which do not use lithography, etching, or the like. For example, as regards a coated magnetic disk, there is known a method in which grooves are formed on a surface of a disk body in a circumferential direction by pressing the disk body (for example, see Patent Document 2).

Patent Document 1: JP-A-2006-127590
Patent Document 2: JP-A-H5-334666

DISCLOSURE OF THE INVENTION

Problems to be Solved by the Invention

However, in those methods using lithography, etching, or the like, a substrate must be subjected to a complicated process. Therefore, mass production of magnetic recording media encounters some problems, for example, prolonged process time and increased cost.

In existing methods, a step of patterning a magnetic recording layer (a discrete processing step) must be performed in the middle of forming the layers of a magnetic recording medium, for example, after the formation of the magnetic recording layer and before the formation of the protection layer. Therefore, in the middle of forming the layers, it is necessary to remove the substrate from a film forming apparatus, performing the discrete processing step, and then mount the substrate to the film forming apparatus again. Thus, the known discrete processing step significantly affects those problems of prolonged process time and increased cost.

For example, in the method disclosed in Patent Document 2, it seems that the problems of prolonged process time and increased cost are less significant. However, this method requires softening a magnetic recording layer by heating and thus cannot easily be applied to widely used thin-film magnetic disks or the like. The thin-film magnetic disks include, for example, magnetic disks having a continuous thin-film type magnetic layer formed by vapor deposition such as sputtering.

Under the above-mentioned background, there is a demand for a method of patterning a magnetic recording layer that is capable of avoiding the problems of prolonged process time and increased cost. In view of the above, it is an object of the present invention to provide a magnetic recording medium and a method of manufacturing a magnetic recording medium which are capable of solving the above-mentioned problems.

Means for Solving the Problems

It is considered that the DTR media and the patterned media must be provided with grooves or the like having a depth corresponding to the entire thickness of the magnetic recording layer. However, through the extensive research, the present inventors have found that grooves having a predetermined shape and small in depth as compared with the technical common sense can appropriately achieve magnetic separation between recording regions. The present inventors also found that such grooves can be formed in a manner less likely to cause the problems of prolonged process time and increased cost.

The present inventors also found that, for example, in case of a CGC medium, even if grooves are formed at least on a continuous film layer of the magnetic recording layer constituted by a granular layer and the continuous film layer, magnetic separation between the recording regions is possible.

Furthermore, the present inventors found that, not only in the CGC medium, in case where the magnetic recording layer has a primary recording layer for recording magnetic signals and an auxiliary recording layer magnetically combined with the primary recording layer, magnetic separation is possible by forming grooves at least on the auxiliary magnetic layer.

The present inventors also found that, in case where a magnetic recording layer has a granular structure and a magnetic coupling layer (not a continuous layer but a monolayer) is formed on the magnetic recording layer to be adjacent thereto, magnetic separation between recording regions is possible by forming grooves at least on the magnetic coupling layer.

The present invention may have the following structures.
(Structure 1)

A magnetic recording medium comprises a substrate and a magnetic recording layer formed on the substrate. The magnetic recording layer has a plurality of tracks which define recording regions extending in a scanning direction of a magnetic head and which are arranged in parallel in a direction intersecting with the scanning direction. The magnetic recording layer is provided with a groove portion which is formed in a region between the tracks on the surface of the magnetic recording layer and which extends along the tracks. The groove portion is formed so that, in a cross-section of the magnetic recording layer taken along a plane perpendicular to the scanning direction, the maximum depth of the groove portion is in the range of 0.5 to 10 nm with reference to an average height of the tracks between which the groove portion is interposed. The average height is obtained in the vicinity of the centers of the tracks in a widthwise direction. In addition, the width of a region of the groove portion having a depth equal to or greater than ½ of the maximum depth is in the range of 5 to 30% of a track pitch which is a distance between the centers of adjacent ones of the tracks in the widthwise direction.

With this structure, it is possible to appropriately perform magnetic separation between the tracks. Such grooves can be formed by directly pressing the magnetic recording layer or an upper layer formed thereon, without using lithography, etching, or the like. Furthermore, the grooves can be formed even after a protection layer or the like is formed on the magnetic recording layer. Thus, the grooves can be formed after the layers of the magnetic recording medium are formed. It is unnecessary to remove the substrate from a film forming apparatus after the magnetic recording layer is formed. Moreover, the layers can be formed in a manner same as or similar to the case where no grooves are formed. Thus, with this structure, a DTR medium, a patterned medium, or the like can be appropriately formed in a manner less likely to cause the problems of prolonged process time and increased cost.

Also, the grooves having the above-mentioned depth can be formed with high positional accuracy as compared with grooves having a depth corresponding to the entire thickness of the magnetic recording layer. Therefore, a DTR medium, a patterned medium, or the like can be formed with high accuracy.

Herein, the magnetic recording medium further has additional layers, such as a protection layer and a lubricant layer, formed on the magnetic recording layer. For example, the protection layer, lubricant layer, and the like are formed on the entire primary surface of the substrate to a constant thickness and, on the groove portions of the magnetic recording layer, sag down along the groove portions. With this structure, even when the additional layers for the purposes other than magnetic recording are formed on the magnetic recording layer, it is possible to properly exhibit the effect of the groove portions related to magnetic properties, such as improvement of S/N ratio.

For example, the magnetic recording medium is a magnetic disk comprising a disk-shaped substrate and a magnetic recording layer formed on the substrate. In the magnetic disk, the cross-section of the magnetic recording layer taken along a plane perpendicular to the scanning direction is, for example, a cross-section taken along a plane parallel to the radial direction.

The surface of the magnetic recording layer is, for example, one surface more distant from the substrate than the other. The depth of each groove portion is, for example, a depth observed in a TEM photograph of the cross-section. The maximum depth of each groove portion is preferably in the range of 1 to 5 nm and more preferably in the range of 3 to 4 nm. In each groove portion, a region having a depth equal to or greater than ½ of the maximum depth has a width preferably in the range of 10 to 15% of a track pitch.

The vicinity of the center of each track in the widthwise direction is, for example, a central area of the track having a width in the range of 5 to 10% of the track pitch. The average height obtained in the vicinity of the centers of the tracks in the widthwise direction is, for example, the average of heights with respect to a predetermined reference plane parallel to the primary surface of the substrate.

When the magnetic recording medium is a patterned medium, the magnetic recording layer is provided with not only the groove portions but also concaved portions, short grooves, or the like for separating bits in each track from one another. For example, the concaved portions, short grooves, or the like have a depth similar to that of the groove portions formed between the tracks.

(Structure 2)

The magnetic recording layer contains magnetic grains of a crystal structure. The magnetic grains under the groove portion have a short crystal axis in a direction perpendicular to a primary surface of the substrate as compared with the magnetic grains in the vicinity of the center of each track in the widthwise direction. With this structure, it is possible to appropriately form the groove portions having necessary functions in a DTR medium, a patterned medium, or the like.

For example, the magnetic recording layer contains magnetic grains of hcp crystals. In this case, the crystal axis perpendicular to the primary surface of the substrate is, for example, the c-axis of the hcp crystals. In this case, the magnetic grains located under the groove portions are grains of the hcp crystals with, for example, their c-axes shortened as compared with magnetic grains in the vicinity of the center of each track.

The magnetic grains located under the groove portions may be degraded in crystallinity as compared with the magnetic grains in the vicinity of the center of each track. For example, degraded crystallinity is an increased variation of orientation. For example, the increased variation of orientation can be confirmed by increase in measurements of $\Delta\theta 50$.

(Structure 3)

A method of manufacturing a magnetic recording medium comprising a substrate and a magnetic recording layer formed on the substrate comprises a magnetic recording layer formation step of forming the magnetic recording layer on the substrate; a protection layer formation step of forming a protection layer on the magnetic recording layer; and a pressing step of pressing a non-recording region of the magnetic recording layer in a direction from an upper side of the protection layer towards a primary surface of the substrate to form a groove portion in the non-recording region. The non-recording region is interposed between a plurality of recording regions in which magnetic signals are recorded, respectively.

With this structure, the recording regions can be magnetically separated, for example, by the groove portions formed in non-recording regions. Consequently, a DTR medium, a patterned medium, or the like is appropriately formed.

It is supposed that the groove portions are formed not by pressing but, for example, by cutting the magnetic recording layer. In this case, in order to form the groove portions after the formation of a protection layer, not only the magnetic recording layer but also the protection layer must be subjected to cutting. However, the protection layer is hard and therefore difficult to cut.

On the other hand, according to the Structure 3, the groove portions can be appropriately formed even after the protection layer is formed. Therefore, the substrate need not be removed from a film forming apparatus after the magnetic recording layer is formed. Thus, with this structure, a DTR medium, a patterned medium, or the like can be formed in a manner less likely to cause the problems of prolonged process time and increased cost.

The magnetic recording layer may be further provided with an additional layer, such as a lubricant layer, formed on the protection layer. In this case, in the pressing step, non-recording regions may be pressed from an upper side of the protection layer by pressing the protection layer from an upper side of the additional layer formed on the protection layer.

(Structure 4)

The protection layer comprises a diamond-like carbon film. The diamond-like carbon film is, for example, a carbon-based film having a diamond-like structure. The diamond-like carbon film may additionally contain, for example, hydrogen, nitrogen, and the like.

The diamond-like carbon film is very hard. However, with the Structure 4, even if such a protection layer is used, the groove portions can be appropriately formed after the protection layer is formed.

(Structure 5)

The method further comprises a lubricant layer formation step of forming a lubricant layer on the protection layer. The pressing step comprises pressing the non-recording region from an upper side of the lubricant layer. With this structure, the groove portions can be appropriately formed after the layers of the magnetic recording layer are continuously formed up to the lubricant layer.

(Structure 6)

The pressing step comprises pressing the non-recording region by using a stamper having a pattern that corresponds to the groove portion to be formed. With this structure, the pressing step can be appropriately carried out.

(Structure 7)

The pressing step comprises pressing the non-recording region by bringing a needle-like member into contact with a surface of the magnetic recording layer. With this structure, the pressing step can be appropriately carried out.

(Structure 8)

The recording regions are defined by a plurality of tracks that extend in a scanning direction of a magnetic head. The pressing step comprises forming the groove portion in a region between the tracks. The groove portion formed in the pressing step is formed so that, in a cross-section of the magnetic recording layer taken along a plane perpendicular to the scanning direction, the maximum depth of the groove portion is in the range of 0.5 to 10 nm with reference to an average height of the tracks between which the groove portion is interposed, the average height being obtained in the vicinity of the centers of the tracks in a widthwise direction. In addition, the width of a region of the groove portion having a depth equal to or greater than ½ of the maximum depth is in the range of 5 to 30% of a track pitch which is a distance between the centers of adjacent ones of the tracks in the widthwise direction.

The above-mentioned grooves can be appropriately formed by the pressing step. Therefore, a DTR medium, a patterned medium, or the like can be formed in a manner less likely to cause the problems of prolonged process time and increased cost.

Effect of the Invention

According to the present invention, it is possible to appropriately form a DTR medium, a patterned medium, or the like in a manner less likely to cause the problems of prolonged process time and increased cost.

BEST MODES FOR CARRYING OUT THE INVENTION (Embodiment 1)

Now, an embodiment of the present invention will be described with reference to the drawings. FIG. 1 shows a structure of a magnetic recording medium 10 according to an embodiment of the present invention. The magnetic recording medium 10 is a magnetic disk to be mounted to a HDD (hard disk drive) of a perpendicular magnetic recoding system and comprises a substrate 12, an adhesion layer 14, a soft-magnetic layer 16, a first underlayer 18, a second underlayer 20, a perpendicular magnetic recording layer 22, a protection layer 24, and a lubricant layer 26.

The substrate 12 is, for example, a disk base made of glass. For example, the glass may be aluminosilicate glass, aluminoborosilicate glass, soda lime glass, and so on. Among others, aluminosilicate glass is favorable. Alternatively, amorphous glass or crystallized glass may be used. The substrate 12 may also be a nonmagnetic substrate made of carbon, Ti, ceramics, or the like.

The adhesion layer 14 serves to improve adhesion between the substrate 12 and the soft-magnetic layer 16. In this embodiment, the adhesion layer 14 is an amorphous CrTi layer. The thickness of the adhesion layer 14 is, for example, approximately 10 nm.

The soft-magnetic layer 16 forms a magnetic circuit between a head and the perpendicular magnetic recording layer 22. For example, the soft-magnetic layer 16 may be made of a Fe-based material, a Co-based material, or the like.

The thickness of the soft-magnetic layer 16 is, for example, in the range of 10 to 200 nm, preferably in the range of 20 to 100 nm.

In this embodiment, the soft-magnetic layer 16 has a plurality of soft-magnetic material layers (SULs) diamagnetically coupled with a Ru layer interposed therebetween. The thickness of the Ru layer is, for example, approximately 0.9 nm. Each of the soft-magnetic material layers may be, for example, a CoTaZr layer having an amorphous structure. Each of the soft-magnetic material layers has a thickness in the range of, for example, 20 to 27.5 nm.

The first underlayer 18 and the second underlayer 20 serve to control the crystal structure of the perpendicular magnetic recording layer 22. In this embodiment, the first underlayer 18 is a Ta layer. The first underlayer 18 has a thickness of, for example, approximately 3 nm. The second underlayer 20 is a Ru alloy layer. The second underlayer 20 has a thickness of, for example, approximately 20 nm.

The perpendicular magnetic recording layer 22 is a magnetic layer containing magnetic grains having a crystal structure. The perpendicular magnetic recording layer 22 is preferably a magnetic layer having a granular structure in which oxides segregate at boundaries between the miniaturized crystal grains. In this embodiment, the perpendicular magnetic recording layer 22 is a (CoCrPt)-6(SiO$_2$) layer. The perpendicular magnetic recording layer 22 has a thickness in the range of, for example, 5 to 45 nm, preferably in the range of 10 to 40 nm.

The protection layer 24 serves to protect the perpendicular magnetic recording layer 22 from impact of the head and comprises, for example, a carbon-based film. The protection layer 24 preferably comprises a diamond-like carbon film. The thickness of the protection layer 24 is, for example, in the range of 1 to 7 nm, preferably in the range of 3 to 5 nm. The lubricant layer 26 serves to improve lubricity between the head and the magnetic recording medium 10. The lubricant layer 26 is, for example, a PFPE (perfluoropolyether) film formed by dip coating.

The magnetic recording medium 10 may further contain a thin metal layer, for example, made of CrTi or the like and, for example, formed between the perpendicular magnetic recording layer 22 and the protection layer 24. With this structure, the surface of the perpendicular magnetic recording layer 22 of a granular structure can be more appropriately protected.

The magnetic recording medium 10 may further comprise, as the second underlayer 20, two Ru alloy layers different in size of crystal grains and intergrain distance from each other. In this case, the upper layer preferably has a smaller size of crystal grains and a longer intergrain distance. With this structure, isolation of crystal grains in the perpendicular magnetic recording layer 22 is promoted.

FIG. 2 shows a structure of the perpendicular magnetic recording layer 22. FIG. 2(a) is a top view of the perpendicular magnetic recording layer 22 and shows an array of tracks 102 arranged on the perpendicular magnetic recording layer 22. The tracks 102 define regions of the perpendicular magnetic recording layer 22 where magnetic signals are recorded and extend in the scanning direction of the magnetic head.

In this embodiment, the perpendicular magnetic recording layer 22 is provided with a plurality of tracks 102 arranged in parallel to one another in a direction intersecting with the head scanning direction. Regions interposed between every adjacent tracks 102 define guard band regions 104 as non-recording regions. In this embodiment, each guard band region 104 is provided with a groove portion 202 extending along the tracks 102.

In this embodiment, the scanning direction of the magnetic head is a circumferential direction of the substrate 12 (see FIG. 1). Therefore, the tracks 102 are concentrically arranged at a constant track pitch L. The track pitch is a distance between the centers of the adjacent ones of the tracks 102 in a widthwise direction. In this embodiment, the track pitch L is, for example, in the range of 60 to 200 nm, preferably in the range of 70 to 150 nm, more preferably in the range of 80 to 100 nm.

FIG. 2(b) is a cross-sectional view of the perpendicular magnetic recording layer 22 and shows a structure of the groove portion 202. The cross-section is taken along a plane parallel to the radial direction of the substrate 12. In this embodiment, the groove portion 202 is formed at a center portion of each guard band region 104 in the widthwise direction. The maximum depth D of each groove portion 202 is, for example, in the range of 0.5 to 10 nm, preferably in the range of 1 to 5 nm. For example, the depth D is a depth with respect to the average height depicted by a broken line 302. The average height is, for example, the average height obtained in the vicinity of the centers of the two tracks 102 between which the groove portion 202 is interposed.

If the maximum depth D of each groove portion 202 is excessively deep (greater than 10 nm), cracks will be caused to occur in the protection layer formed on the perpendicular magnetic recording layer. From the cracks, corrosion of the perpendicular magnetic recording layer is started.

If the maximum depth D of each groove portion 202 is excessively shallow (smaller than 0.5 nm), no substantial difference exists between crystal axes of the magnetic grains at a pressed portion of the perpendicular magnetic recording layer and those at a non-pressed portion. Therefore, perpendicular magnetic anisotropy is not decreased so that magnetic separation can not be achieved.

In each groove portion 202, a region having a depth equal to or greater than ½ of the maximum depth D has a width W corresponding to, for example, 5 to 30%, preferably 10 to 15%, of the track pitch L. With this structure, magnetic separation between the tracks 102 can be appropriately performed. Therefore, the magnetic recording medium 10 properly works as a DTR medium.

If the width W of each groove portion 202 is excessively large (greater than 30%), those portions reduced in magnetic anisotropy are increased. This results in decrease in recording capacity.

The magnetic recording medium 10 may be a patterned medium. In this case, the magnetic recording layer 22 is provided with not only the groove portions 202 but also concaved portions, short grooves, or the like for separating bits in each track 102 from one another. The concaved portions, short grooves, or the like have a depth similar to that of the groove portions 202.

FIG. 3 is a flow chart showing a method of manufacturing the magnetic recording medium 10. In the following description, the steps may be same as or similar to known steps except for the pressing step S110.

In this embodiment, the substrate 12 is cleaned at first (S102). Then, the substrate 12 is mounted to a film forming apparatus such as a DC magnetron sputtering apparatus. An adhesion layer formation step, a magnetic recording layer formation step, and a protection layer formation step are successively carried out to form the adhesion layer 14, the perpendicular magnetic recording layer 22, and the protection layer 24 (S104). In the protection layer formation step, the protection layer 24 is formed, for example, by CVD. Each of the adhesion layer formation step, the magnetic recording layer formation step, and the protection layer formation step is carried out, for example, by using a method same as or similar to the known method. For example, in the adhesion layer formation step, the adhesion layer 14 is formed on the substrate 12. In the magnetic recording layer formation step, the perpendicular magnetic recording layer 22 is formed on the substrate 12 after those layers from the adhesion layer 14 to the second underlayer 20 are formed thereon. As regards the protection layer 24, the protection layer 24 is formed on the perpendicular magnetic recording layer 22. Thus, in this embodiment, in those steps from the adhesion layer formation step to the protection layer formation step, the respective layers from the adhesion layer 14 to the protection layer 24 are successively formed on the substrate 12 without removing the substrate 12 from the film forming apparatus.

Subsequently, a lubricant layer formation step is carried out to form the lubricant layer 26 on the protection layer 24 (S106). Preferably, the lubricant layer formation step is performed in the film forming apparatus used to form those layers up to the protection layer 24 and continuously from the formation of these layers up to the protection layer 24. Next, a head varnishing step is carried out to remove particles, protrusions, and the like from the surface of the magnetic recording medium 10 with those layers up to the lubricant layer 26 formed thereon (S108). This head varnishing step may be replaced by a tape varnishing step using a tape.

Next, a pressing step is performed (S110). In the pressing step, the perpendicular magnetic recording layer 22 is pressed in an area to be the guard band regions 104 in a direction from an upper side of the lubricant layer 26 towards the principal surface of the substrate 34. Thus, in the pressing step, the groove portions 202 are formed in the guard band regions 104. When the lubricant layer 26 is formed using another film forming apparatus different from that used to form those layers up to the protection layer 24, the pressing step may be carried out between the protection layer formation step and the lubricant layer formation step.

In the pressing step, the guard band regions 104 are pressed using, for example, a stamper having a pattern that corresponds to the groove portions 202. The pattern that corresponds to the groove portions 202 is, for example, a discrete track pattern that corresponds to groove portions for a DTR medium. For example, the stamper is formed by nanoimprint technology. In this manner, the groove portions 202 can be appropriately formed by pressing. The stamper may form various kinds of markers on the perpendicular magnetic recording layer 22 simultaneously with the formation of the groove portions 202. For example, such marker may be a marker indicating a servo starting point.

In the pressing step, the guard band regions 104 may be pressed by bringing a needle-like member such as a needle-like machining chip into contact with the surface of the perpendicular magnetic recording layer 22. In this case, it is preferable that the needle-like member is brought into contact with the surface of the perpendicular magnetic recording layer 22 while the magnetic recording medium 10 is rotated. In this case also, the groove portions 202 are appropriately formed by pressing.

The pressing step is followed by an inspection step of inspecting the magnetic recording medium 10 (S112). Then, the flow chart is terminated. In the inspection step, for example, a glide test may be performed.

According to this embodiment, the groove portions 202 are appropriately formed after the formation of those layers up to the lubricant layer 26. Therefore, it is unnecessary to remove the substrate 12 from a film forming apparatus after the formation of the perpendicular magnetic recording layer 22. Thus, according to this embodiment, a DTR medium, a patterned medium, or the like can be appropriately formed in a manner less likely to cause the problems of prolonged process time and increased cost.

The magnetic grains under the groove portions 202 formed in the pressing step have a short crystal axis in a direction perpendicular to the primary surface of the substrate 12, for example, as compared with the magnetic grains in the vicinity of the center of each track 102. As a result, the crystallinity of the magnetic grains under the groove portions is inferior, for example, as compared with that in the vicinity of the center of each track. In this case, perpendicular magnetic anisotropy in the guard band regions 104 is decreased so that magnetic separation between the tracks 102 is more appropriately carried out. Therefore, according to this embodiment, the groove portions 202 having a function necessary in a DTR medium, a patterned medium, or the like can be more appropriately formed.

(Embodiment 2)

Hereinafter, Embodiment 2 of the present invention will be described with reference to drawings. FIG. 5 shows a magnetic recording medium 10 according to one embodiment of the present invention. FIG. 1 shows a structure of the magnetic recording medium 10. In this embodiment, the magnetic recording medium 10 is a magnetic disk of a double-layered perpendicular medium type to be mounted to a HDD (hard disk drive) of a perpendicular magnetic recording system, and comprises a substrate 12, an adhesion layer (a coherent layer) 14, a soft-magnetic layer 16, an underlayer 18, a perpendicular magnetic recording layer 430, a protection layer 24, and a lubricant layer 26 in this order. The perpendicular magnetic recording layer 430 has a granular layer 420, a coupling control layer 422, and a continuous film layer 424.

In this embodiment, the substrate 12, the adhesion layer 14, the soft-magnetic layer 16, the protection layer 24, and the lubricant layer 26 are similar to those described in Embodiment 1 and, therefore, description thereof is omitted.

The underlayer 18 serves to control the crystal structure of the perpendicular magnetic recording layer 430. The underlayer 18 may be a multilayer film composed of a plurality of kinds of films. In this embodiment, the underlayer 18 comprises a first orientation control layer, a second orientation control layer, an isolation promoting layer, and a miniaturization promoting layer which are formed on the soft-magnetic layer 16 in this order.

The first orientation control layer serves to control the crystal orientation of the second orientation control layer as an upper layer formed thereon. In this embodiment, the first orientation control layer is, for example, a Ta layer or a CoCrTa layer having a bcc crystal structure near an amorphous structure. The thickness of the first orientation control layer is, for example, approximately 3 nm. The second orientation control layer serves to improve the orientation of an upper layer formed thereon. In this embodiment, the second orientation control layer is a Ru layer having a hcp crystal structure. The second orientation control layer has a thickness of, for example, approximately 10 nm.

The isolation promoting layer serves to promote isolation of the crystal grains by separating the compositions of an upper layer formed thereon. For example, the isolation promoting layer is formed by sputtering under a gas pressure higher than that during formation of the Ru layer as the second orientation control layer. Thus, the isolation promoting layer is formed as a layer in which crystals are small and crystal grains are separated from one another. In this embodiment, the isolation promoting layer is a Ru layer having a hcp crystal structure. The isolation promoting layer has a thickness of, for example, approximately 10 nm.

The miniaturization promoting layer serves to promote miniaturization of crystal grains of an upper layer formed thereon. In this embodiment, the miniaturization promoting layer is a layer ($CoCr$—$SiO_2$ layer) of a granular structure containing nonmagnetic crystal grains, in which $SiO_2$ segregates at boundaries between nonmagnetic CoCr crystal grains. In the miniaturization promoting layer, the crystal structure of CoCr is, for example, a hcp crystal structure. The miniaturization promoting layer may partially contain CoCr of a bcc crystal structure. In the miniaturization promoting layer, the content of $SiO_2$ is, for example, approximately 12 at % (for example, 10 to 16 at %). The thickness of the miniaturization promoting layer is, for example, approximately 2 nm. On the miniaturization promoting layer, the granular layer 420 of the perpendicular magnetic recording layer 430 is formed.

The granular layer 420 has a granular structure in which oxides segregate at boundaries between miniaturized crystal grains, and is an example of a primary recording layer. In this embodiment, the granular layer 420 is a $CoCrPt$—$SiO_2$ layer and contains magnetic grains and a nonmagnetic substance that magnetically separates the magnetic grains from one another at the boundaries of the magnetic grains. The thickness of the granular layer 420 is, for example, 20 nm or less, preferably in the range of 8 to 16 nm, more preferably in the range of 7 to 15 nm (for example, approximately 9 nm).

In the granular layer 420, the magnetic grains are crystal grains exhibiting perpendicular magnetic anisotropy, and reverse a magnetic moment in response to signals recorded in the granular layer 420. In this embodiment, the magnetic grains are CoCrPt of a hcp crystal structure. The size (diameter) of each magnetic grain is in the range of, for example, 5 to 20 nm, preferably in the range of 8 to 15 nm. The width of the grain boundary of the magnetic grains is equal to or greater than 0.5 nm, for example, in the range of 1 to 20 nm. Herein, the width of the grain boundary of the magnetic grains is, for example, the average of widths of the grain boundaries of the magnetic grains in the granular layer 420.

The nonmagnetic substance contained in the granular layer 420 is a nonmagnetic oxide that segregates at the boundaries of the magnetic grains. In this embodiment, the nonmagnetic substance is, for example, silicon oxide ($SiO_2$). As the nonmagnetic substance, for example, titanium oxide ($TiO_2$) may be used instead of $SiO_2$. In the granular layer 420, the content ratio of $SiO_2$ or the like is, for example, in the range of 10 to 16 at %, preferably in the range of 12 to 14%.

If the content ratio of $SiO_2$ or the like is equal to or higher than 6 at %, the S/N ratio is improved by miniaturization of the nonmagnetic substance. However, the coercive force Hc and perpendicular magnetic anisotropy of the granular layer 420 itself may be degraded. It is also supposed that, consequently, thermal stability of the granular layer 420 itself is degraded. In this embodiment, however, the continuous film layer 424 is formed on the granular layer 420. It is therefore possible to suppress occurrence of these problems even if the content ratio of $SiO_2$ or the like in the granular layer 420 is increased.

The coupling control layer 422 serves to control the strength of magnetic coupling between the granular layer 420 and the continuous film layer 424. In this embodiment, the coupling control layer 422 is, for example, a Pd layer having a fcc crystal structure. The thickness of the coupling control layer 422 is, for example, equal to or smaller than 2 nm, for example, in the range of 0.5 to 1.5 nm, preferably in the range of 0.7 to 1.0 nm (for example, approximately 0.8 nm). The coupling control layer 422 may be a Pt layer.

The continuous film layer 424 is a layer in which exchange coupling in a direction parallel to the primary surface of the substrate 12 continuously spread. The continuous film layer 424 is an example of the auxiliary magnetic layer and contains magnetic grains exhibiting perpendicular magnetic anisotropy. These magnetic grains form magnetic exchange coupling with the magnetic grains of the granular layer 420 in the direction perpendicular to the primary surface of the substrate 12.

The width of the boundaries between these magnetic grains is smaller than that of the boundaries of the magnetic grains in the granular layer 420 and is, for example, equal to or smaller than 1 nm, for example, in the range of 0.1 to 1 nm, preferably in the range of 0.3 to 0.8 nm. With this structure, the magnetic grains in the continuous film layer 424 form strong exchange coupling with one another in the direction parallel to the primary surface of the substrate 12, as compared with the coupling force between the magnetic grains in the granular layer 420. Therefore, with this structure, thermal stability of recorded signals is improved by pinning magnetization of the continuous film layer 424 by magnetization of the granular layer 420. The thickness of the continuous film layer 424 is, for example, in the range of 1 to 8 nm, preferably in the range of 3 to 6 nm, more preferably in the range of 4 to 5 nm.

The ratio A/B of the thickness A of the granular layer 420 and the thickness B of the continuous film layer 424 is, for example, in the range of 1 to 5, preferably in the range of 2 to 4. With this structure, excellent perpendicular magnetic recording properties are exhibited by exchange coupling. Preferably, the magnetic grains in the continuous film layer 424 have a magnetic anisotropy constant (maximum anisotropic energy) Ku greater than, for example, that of a soft-magnetic material. With this structure, the magnetic domain walls formed in the continuous film layer 424 can be reduced in width. The continuous film layer 424 may have a magnetic anisotropy constant Ku greater than that of the granular layer 420. The material of the continuous film layer 424 may have a coercive force Hc smaller than, for example, the coercive force Hc of the material of the magnetic grains in the granular layer 420.

In this embodiment, the continuous film layer 424 is a multilayer film comprising CoCr layers 406 and Pd layers 408, each kind of layers being about three in number (for example, two to three layers), alternately laminated. The CoCr layers 406 contain magnetic grains of CoCr. Each of the CoCr layers 406 has a thickness of, for example, approximately 0.35 nm. When the CoCr layers 406 are very thin as described above, the magnetic grains of CoCr may not have a crystal structure. The CoCr layer 406 may contain magnetic grains of CoCr having a hcp crystal structure. The Pd layer 408 is a nonmagnetic Pd layer having a hcp crystal structure. The Pd layer 408 has a thickness of, for example, approximately 0.8 nm. With this structure, interface magnetic anisotropy is produced at the boundaries between the CoCr layers 406 and the Pd layers 408. By laminating three layers for each kind, necessary perpendicular magnetic anisotropy is obtained. With this structure, the continuous film layer 424 can be reduced in thickness as compared with the case where the continuous film layer 424 is a monolayer.

The continuous film layer 424 may comprise, for example, a Pt layer instead of the Pd layer 408. The continuous film layer 424 may comprise a CoB layer instead of the CoCr layer 406. The continuous film layer 424 may be a multilayer film [CoX/Pd or Pt]n comprising Co compound layers, n in number, and Pd or Pt layers, n in number, which are alternately laminated. The continuous film layer 424 may comprise a monolayer film with a large content of Pt. The continuous film layer 424 may be a monolayer film of CoCrPt, CoPt, CoPd, FePt, $CoPt_3$, $CoPd_3$, amorphous TbFeCoCr, $SmCo_5$, $Nd_2Fe_{14}B$, $Co_{20}Pt_{80}$, or the like.

In Embodiment 2, in the magnetic recording layer 430 comprising the granular layer 420 and the continuous film layer 424, at least the continuous film layer 424 is provided with groove portions. With this structure, the recording regions can be magnetically separated from one another.

The groove portions may be formed substantially only on the continuous film layer. With this structure, it is unnecessary to form the groove portions with a high aspect ratio. Therefore, as compared with the case where the groove portions are formed throughout the entire thickness of the magnetic recording layer, the groove portions can be formed easily and with high accuracy. The structure in which the groove portions are formed only on the continuous film layer includes the case where the groove portions are formed to reach a part of the primary recording layer as far as the accuracy of the formation of the groove portions and the man-hour required therefor are not affected. For example, the structure includes the case where the groove portions are formed from the continuous film layer 424 to an upper part of the granular layer 420.

In the foregoing Embodiment 2, description has been made of the aspect in which the grooves are formed on the continuous film layer 424 as an example of the auxiliary magnetic layer. However, the present invention is not limited to the above-mentioned aspect. The present invention includes the aspect in which, when a magnetic recording layer has a primary recording layer for recording magnetic signals and an auxiliary recording layer magnetically coupled with the primary recording layer, grooves are formed at least on the auxiliary magnetic layer. With this structure, the recording regions can be magnetically separated from one another.

For example, the magnetic recording medium has at least two magnetic layers different in composition and forming exchange coupling with each other. The primary recording layer is, for example, one of the two magnetic layers which is greater in thickness or coercive force. The auxiliary recording layer is a magnetic layer smaller in thickness or coercive force. Preferably, the magnetic anisotropy constant Ku of the auxiliary magnetic layer is greater than the magnetic anisotropy constant Ku of the primary recording layer.

Preferably, in the primary recording layer and the auxiliary magnetic layer, the groove portions are formed substantially only on the auxiliary magnetic layer. With this structure, it is unnecessary to form the groove portions with a high aspect ratio. Therefore, as compared with the case where the groove portions are formed throughout the entire thickness of the magnetic recording layer, the groove portions can be formed easily and with high accuracy. The structure in which the groove portions are formed only on the auxiliary magnetic layer includes the case where the groove portions are formed to reach a part of the primary recording layer as far as the accuracy of the formation of the groove portions and the man-hour required therefor are not affected.

In the foregoing Embodiment 2, the matters related to the position of the groove portions as well as the shape and the dimension of the groove portions (the matters described in connection with FIGS. 2 and 3), the matters related to the method of forming the groove portions, such as the pressing step, and other matters are similar to those in the Embodiment 1 and description thereof will be omitted.

(Embodiment 3)

Hereinafter, Embodiment 3 of the present invention will be described with reference to FIG. 6.

In this embodiment, the magnetic recording medium 10 comprises a substrate 12, an adhesion layer (a coherent layer) 14, a soft-magnetic layer 16, an underlayer 18, a perpendicular magnetic recording layer 430, a protection layer 24, and a lubricant layer 26 in this order. The perpendicular magnetic recording layer 430 has a granular layer 420 and a magnetic coupling layer 425 (not a continuous layer but a monolayer) laminated in this order.

In this embodiment, the substrate 12, the adhesion layer 14, the soft-magnetic layer 16, the underlayer 18, the protection layer 24, and the lubricant layer 26 are similar to those described in Embodiment 1 and, therefore, description thereof is omitted.

In Embodiment 3, the magnetic coupling layer comprises a thin film formed on the magnetic recording layer of a granular structure and exhibiting perpendicular magnetic anisotropy. By exchange interaction of the magnetic coupling layer magnetically coupled with the magnetic grains in the magnetic recording layer, the perpendicular magnetic recording layer and the magnetic coupling layer form magnetic coupling.

For example, the magnetic coupling layer may be made of an alloy material, such as CoCr, CoCrTa, CoCrPt, CoCrPtTa, or CoCrPtB.

The magnetic coupling layer preferably contains at least CoCrPt. If CoCrPt is a main component, high temperature resistance is obtained in addition to high-density recording capability and low-noise property of the granular layer.

The magnetic coupling layer has a non-granular structure in which metal oxides or metal nitrides are not contained at the boundaries between the magnetic grains (non-magnetic grain boundaries).

The thickness of the magnetic coupling layer is, for example, in the range of 1 to 20 nm, preferably in the range of 5 to 15 nm.

The thickness of the magnetic coupling layer is preferably equal to or smaller than twice that of the granular layer, more preferably equal to or smaller than that of the granular layer. The lower limit of the thickness is greater than zero. Preferably, the thickness is selected so as to exhibit the function as the magnetic coupling layer.

In Embodiment 3, in case where the magnetic recording layer 420 of a granular structure 420 and the magnetic coupling layer (not a continuous layer but a monolayer) 425 are provided, grooves are formed at least on the magnetic coupling layer 425. With this structure, the recording regions can be magnetically separated from one another.

Preferably, the groove portions are formed substantially only on the magnetic coupling layer. With this structure, it is unnecessary to form the groove portions with a high aspect ratio. Therefore, as compared with the case where the groove portions are formed throughout the entire thickness of the magnetic recording layer, the groove portions can be formed easily and with high accuracy. The structure in which the groove portions are formed only on the magnetic coupling layer includes the case where the groove portions are formed to reach a part of the primary recording layer as far as the accuracy of the formation of the groove portions and the man-hour required therefor are not affected.

In the foregoing Embodiment 3, the matters related to the position of the groove portions as well as the shape and the dimension of the groove portions (the matters described in connection with FIGS. 2 and 3), the matters related to the method of forming the groove portions, such as the pressing step, and other matters are similar to those in the Embodiment 1 and description thereof will be omitted.

(Embodiment 4)

Hereinafter, Embodiment 4 of the present invention will be described with reference to FIG. 7.

In Embodiment 4, on the medium with those layers up to the protection layer 24 formed according to Embodiments 1 to 3, the groove portions are formed, for example, by using a stamper having a pattern that corresponds to the groove portions to be formed. Thereafter, a protection layer 25 is formed on the protection layer 24 and the surface is flattened. Then, the lubricant layer 26 is formed.

Hereinafter, the present invention will be described more in detail with reference to an example.

Example 1

FIG. 4 includes views for describing Example 1. In order to confirm the effect of the present invention, the magnetic recording medium 10 with the groove portions 202 formed at a part of the tracks 102 in a circumferential direction was formed. The groove portions 202 to be formed in the guard band regions 104 were formed at a part of the tracks 102 for the purpose of measuring magnetic signals in the regions having groove portions 202 by the use of an ordinary head.

FIG. 4(a) is a cross-section TEM photograph of the magnetic recording medium 10 according to Example 1. In this example, the groove portions 202 having a maximum depth of 3 nm were formed. In the TEM photograph, the layer labelled "SUL" is the soft-magnetic layer 16. The layers labelled "UL" are the first underlayer 18 and the second underlayer 20. The layer labelled "Mag" is the perpendicular magnetic recording layer 22. The layers labelled "COC & Lub" are the protection layer 24 and the lubricant layer 26. The layers labelled "METAL FOR TEM" and "CARBON FOR TEM" are a metal layer and a carbon layer which are formed in order to take the TEM photograph.

FIG. 4(b) is a tracing view of the result of measurement of magnetic signals and shows signal attenuation caused by the groove portions 202. The lower part of FIG. 4(b) shows the result of measurement for a single circuit in the circumferential direction. It is confirmed that a region of attenuated magnetic signals is present in correspondence to the region having the groove portion 202. The upper part of FIG. 4(b) is an enlarged view of the region of attenuated magnetic signals. From FIG. 4(b), it is confirmed that, by formation of the groove portions 202, a DTR medium, a patterned medium, or the like can be appropriately formed.

Although the present invention has thus far been described with reference to the embodiments, the technical scope of the present invention is not limited by the scope of description of the embodiments. It is obvious for those skilled in the art that these embodiments may be modified or improved in various manners. From the claims, it is obvious that modified or improved embodiments are encompassed within the technical scope of the present invention.

INDUSTRIAL APPLICABILITY

The present invention can be suitably used, for example, in magnetic recording media.

BRIEF DESCRIPTION OF THE DRAWINGS

FIG. 2(a) is a top view of the perpendicular magnetic recording layer 22. FIG. 2(b) is a cross-sectional view of the perpendicular magnetic recording layer 22.

FIG. 4(a) is a cross-section TEM photograph of a magnetic recording medium 10 according to Example 1. FIG. 4(b) is a tracing view of the result of measurement of magnetic signals and shows signal attenuation caused by groove portions 202.

REFERENCE NUMERALS

Figure 1:
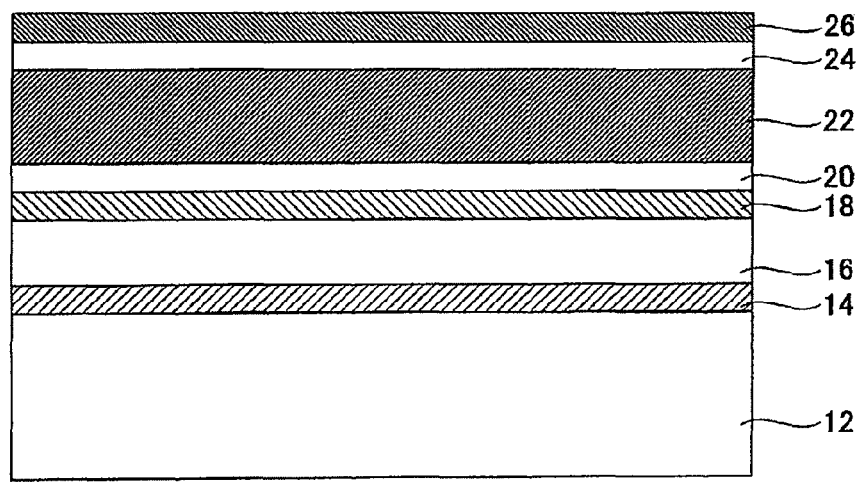
FIG. 1 shows a magnetic recording medium 10 according to an embodiment of the present invention.
Figure 2:
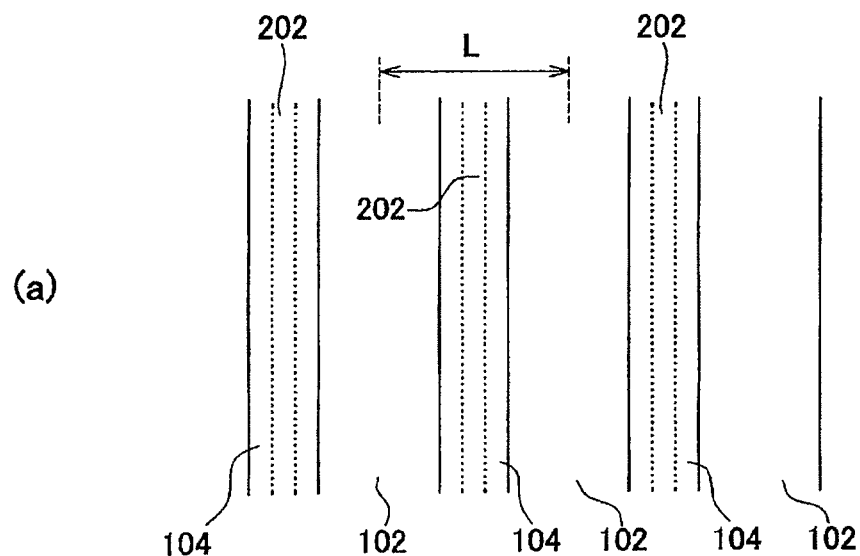
FIG. 2 shows a structure of a perpendicular magnetic recording layer 22.
Figure 2:
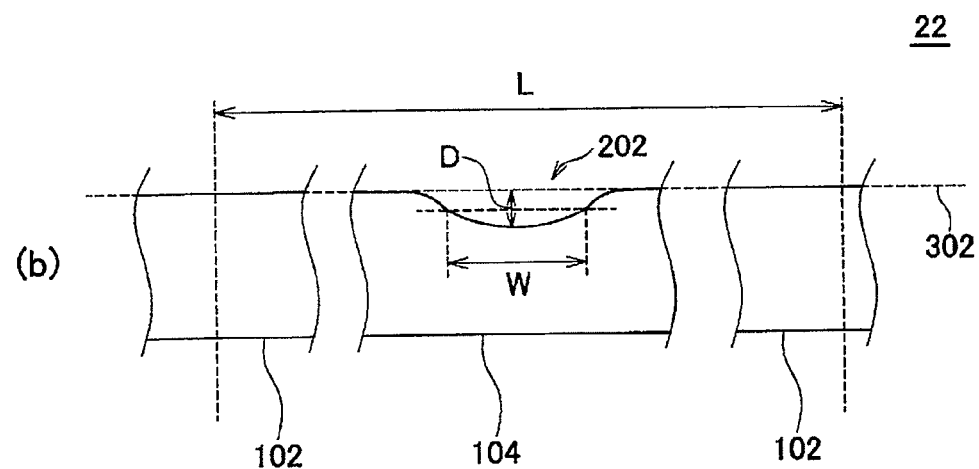
Figure 3:
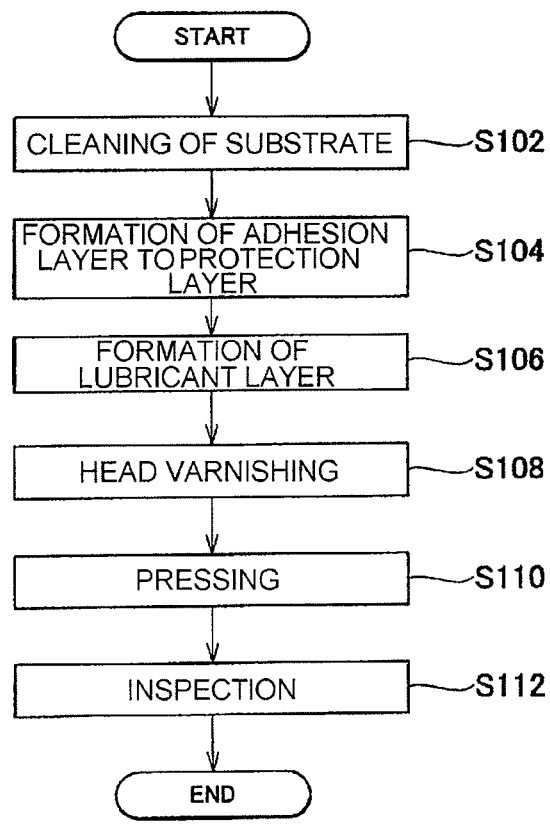
FIG. 3 is a flow chart showing a method of manufacturing the magnetic recording medium 10.
Figure 4:
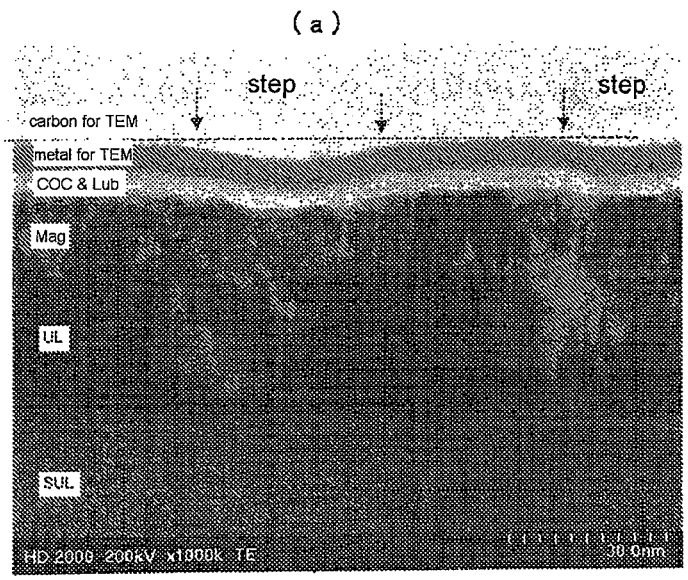
FIG. 4 includes views for describing Example 1.
Figure 4:
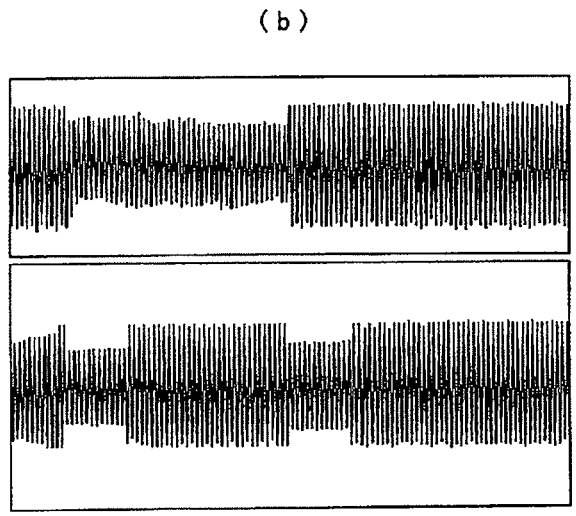
Figure 5:
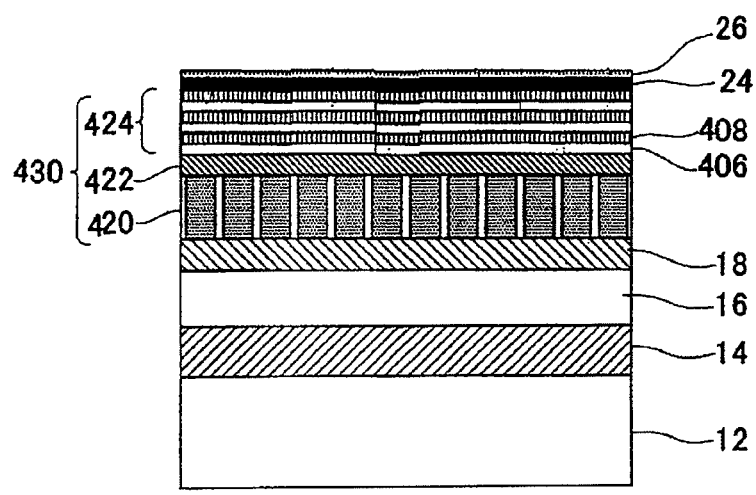
FIG. 5 shows a structure of a magnetic recording medium 10 according to Embodiment 2 of the present invention.
Figure 6:
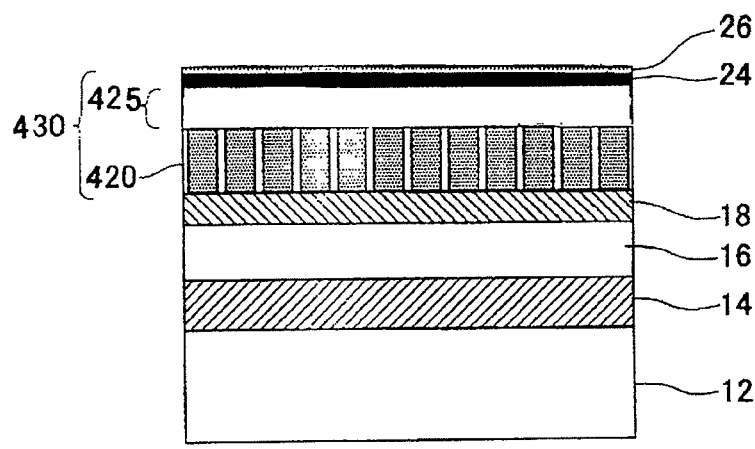
FIG. 6 shows a structure of a magnetic recording medium 10 according to Embodiment 3 of the present invention.
Figure 7:
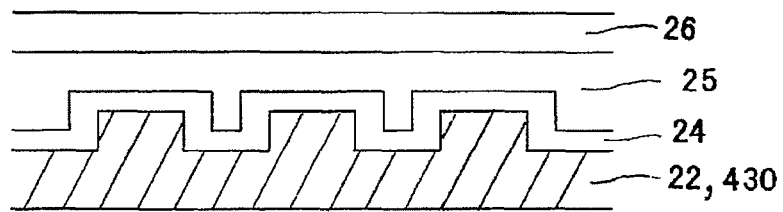
FIG. 7 shows a structure of a magnetic recording medium 10 according to Embodiment 4 of the present invention.

10 . . . magnetic recording medium, 12 . . . substrate, 14 . . . adhesion layer, 16 . . . soft-magnetic layer, 18 . . . first underlayer, 20 . . . second underlayer, 22 . . . perpendicular magnetic recording layer, 24 . . . protection layer, 26 . . . lubricant layer, 102 . . . track, 104 . . . guard band region, 202 . . . groove portion, 302 . . . broken line.

The invention claimed is:

1. A magnetic recording medium comprising a substrate and a magnetic recording layer formed on the substrate, wherein:
   the magnetic recording layer, comprising a primary recording layer for recording magnetic signals and an auxiliary recording layer magnetically coupled with the primary recording layer, having a different composition from the primary recording layer and having a smaller thickness or coercive force than the primary recording layer, has a plurality of tracks which define recording regions extending in a scanning direction of a magnetic head and which are arranged in parallel in a direction intersecting with the scanning direction;
   the magnetic recording layer being provided with a groove portion which is formed at least in the auxiliary recording layer but not extending through the primary recording layer in a region between the tracks on the surface of the magnetic recording layer and which extends along the tracks; and
   the groove portion being formed so that, in a cross-section of the magnetic recording layer taken along a plane perpendicular to the scanning direction:
      the maximum depth of the groove portion is in the range of 0.5 to 10 nm with reference to an average height of the tracks between which the groove portion is interposed, the average height being obtained in the vicinity of the centers of the tracks in a widthwise direction, and
      the width of a region of the groove portion having a depth equal to or greater than ½ of the maximum depth is in the range of 10-15% of a track pitch which is a distance between the centers of adjacent ones of the tracks in the widthwise direction.

2. The magnetic recording medium according to claim 1, wherein:
   the magnetic recording layer contains magnetic grains of a crystal structure;
   the magnetic grains under the groove portion having a short crystal axis in a direction perpendicular to a primary surface of the substrate as compared with the magnetic grains in the vicinity of the center of each track in the widthwise direction.

3. The magnetic recording medium according to claim 1, wherein the track pitch is in a range of 70 to 150 nm.

4. The magnetic recording medium according to claim 1, wherein the track pitch is in a range of 80 to 100 nm.

5. A magnetic recording medium comprising a substrate and a magnetic recording layer formed on the substrate, wherein:
   the magnetic recording layer, comprising a primary recording layer having a granular structure for recording magnetic signals and a magnetic coupling layer formed on the primary recording layer and having a different composition from the primary recording layer, has a plurality of tracks which define recording regions extending in a scanning direction of a magnetic head and which are arranged in parallel in a direction intersecting with the scanning direction;
   the magnetic recording layer being provided with a groove portion which is formed at least in the magnetic coupling layer but not extending through the primary recording layer in a region between the tracks on the surface of the magnetic recording layer and which extends along the tracks; and
   the groove portion being formed so that, in a cross-section of the magnetic recording layer taken along a plane perpendicular to the scanning direction:
      the maximum depth of the groove portion is in the range of 0.5 to 10 nm with reference to an average height of the tracks between which the groove portion is interposed, the average height being obtained in the vicinity of the centers of the tracks in a widthwise direction, and
      the width of a region of the groove portion having a depth equal to or greater than ½ of the maximum depth is in the range of 10 to 15% of a track pitch which is a distance between the centers of adjacent ones of the tracks in the widthwise direction,
   wherein the magnetic coupling layer is formed as a monolayer on the primary recording layer to be adjacent thereto, said grooves being formed at least on the magnetic coupling layer.

6. The magnetic recording medium according to claim 5, wherein said monolayer comprises a thin film of non-granular material and the primary layer has a granular structure and exhibits perpendicular magnetic anisotropy.

7. The magnetic recording medium according to claim 6, wherein said groove is only in said magnetic coupling layer and not in said primary recording layer.

8. The magnetic recording medium according to claim 5, wherein a thickness of the primary recording layer is in a range of 7 to 15 nm.

9. The magnetic recording medium according to claim 5, wherein the primary recording layer includes a non-magnetic substance.

10. The magnetic recording medium according to claim 9, wherein the non-magnetic substance is selected from the group consisting of silicon oxide and titanium oxide.

11. The magnetic recording medium according to claim 9, wherein an amount of the non-magnetic substance is in a range of 10 to 16%.

12. A magnetic recording medium comprising a substrate and a magnetic recording layer formed on the substrate, wherein:
   the magnetic recording layer, comprising a primary recording layer having a granular structure for recording magnetic signals and a magnetic coupling layer formed on the primary recording layer and having a different composition from the primary recording layer, has a plurality of tracks which define recording regions extending in a scanning direction of a magnetic head and which are arranged in parallel in a direction intersecting with the scanning direction;

the magnetic recording layer being provided with a groove portion which is formed at least in the magnetic coupling layer but not extending through the primary recording layer in a region between the tracks on the surface of the magnetic recording layer and which extends along the tracks; and the groove portion being formed so that, in a cross-section of the magnetic recording layer taken along a plane perpendicular to the scanning direction:

the maximum depth of the groove portion is in the range of 0.5 to 10 nm with reference to an average height of the tracks between which the groove portion is interposed, the average height being obtained in the vicinity of the centers of the tracks in a widthwise direction, and the width of a region of the groove portion having a depth equal to or greater than ½ of the maximum depth is in the range of 10 to 15% of a track pitch which is a distance between the centers of adjacent ones of the tracks in the widthwise direction, wherein the magnetic coupling layer is formed as a continuous layer on the primary recording layer to be adjacent thereto, said grooves being formed at least on the magnetic coupling layer.

13. The magnetic recording medium according to claim 12, wherein said continuous layer comprises a multi-layer film, comprising CoCr layers and layers of at least one of Pt and Pd, and having magnetic anisotropy greater than that of said primary layer.

14. The magnetic recording medium according to claim 13, wherein said groove is only in said magnetic coupling layer and not in said primary recording layer.

15. The magnetic recording medium according to claim 13, wherein said groove is in said magnetic coupling layer and only in an upper part of said primary recording layer.

16. The magnetic recording medium according to claim 13, wherein said CoCr layers each has a thickness of approximately 0.35 nm.

17. The magnetic recording medium according to claim 13, wherein said at least one of Pt and Pd layers and said CoCr layers each has a thickness of approximately 0.8 nm.

* * * * *